Feb. 19, 1957 A. COLLETT 2,782,385

ELECTRONIC TUNER

Filed June 8, 1954

INVENTOR
ANTHONY COLLETT
BY
[signature]
ATTORNEY

United States Patent Office 2,782,385 Patented Feb. 19, 1957

2,782,385

ELECTRONIC TUNER

Anthony Collett, Verona, N. J., assignor to The Colber Corp., Irvington, N. J., a corporation of New Jersey Application June 8, 1954, Serial No. 435,150

2 Claims. (Cl. 336—136)

Figure 1:
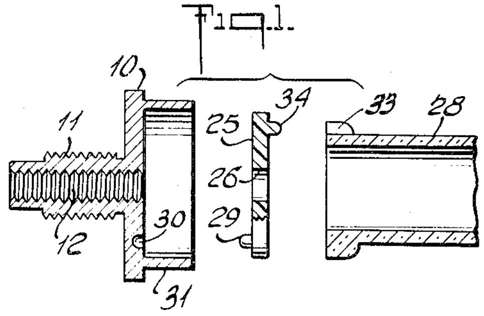

This invention relates to electronic devices, and more particularly to a device designed for use as an electronic unit having a novel means for securing the parts together and to preclude their accidental displacement, and novel means for holding a moving part in the tuned position to which the same may be moved from time to time by the operator.

Electronic devices such as that to which the present invention relates are used frequently for the control of critical conditions. Any random movement of the moving parts thereof will upset the adjusted circuit setting. The device of the present invention provides a means for precluding random movement of the moving parts of such devices without interfering with the movement thereof by the operator from time to time as desired, the parts being of such structural features (hereinafter described) that the moving member will be automatically locked at all times.

These and other advantageous objects, which will appear from the drawings and from the description hereinafter, are accomplished by the structure of my invention, of which an embodiment is illustrated in the drawings. It will be apparent, from a consideration of said drawings and the following description, that the invention may be embodied in other forms suggested thereby, and such other forms as come within the scope of the appended claims are to be considered within the scope and purview of the instant invention.

Figure 2:
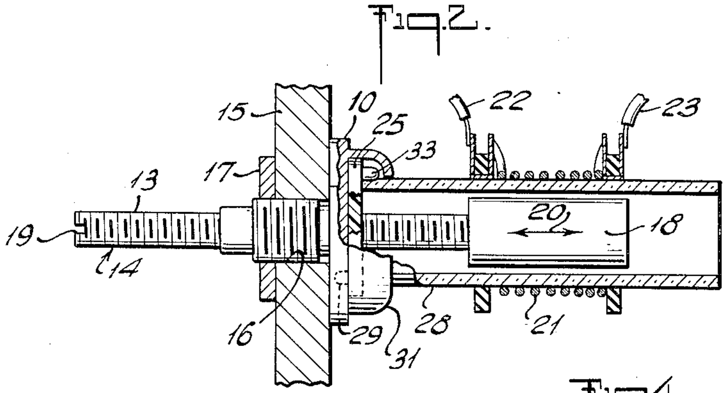
Figure 3:
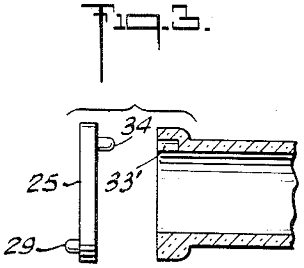
Figure 4:
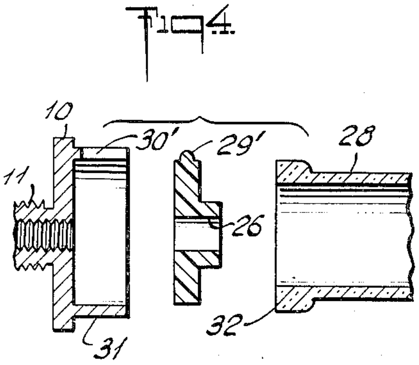
Figure 5:
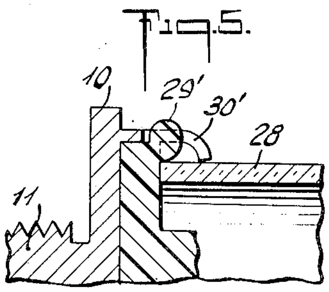

In the drawings:

Fig. 1 is a fragmentary exploded view of the base member disc and one end of a coil support member embodying the invention, Fig. 2 is a view thereof showing the same assembled on a panel and with the shaft movably mounted in a hub portion of the base member, Fig. 3 is an exploded view of another form of means for securing the disc and coil support together and against independent relative rotation, Fig. 4 is a further modified view thereof, and Fig. 5 is an assembled view of the parts shown in Fig. 4.

As shown in the drawings, the electronic tuner of the invention comprises a base member 10 having a hub portion 11 provided with a formed aperture 12 to be received and engaged by a complementarily formed portion 13 of an elongated shaft 14. The hub portion 11 of the base member is secured to the panel 15 which may be a control panel on which the device is mounted, having an opening 16 to receive the hub 11. A nut 17 or the like engages the hub portion 11 of the base 10 and the front face of the panel 15 to secure said base member to said panel as shown in Fig. 2.

As shown in the drawings, the elongated shaft 14 has secured to the other end thereof, an element 18 which may be a metallic slug, core, or the like, which is rotated and reciprocates in the direction of the arrow 20 on the rotation of the shaft 13 (such rotation being attained by any suitable means as by inserting a tool into the socket or keyway 19 at the free front end of shaft 13). This movement of core 18 is relative to a fixed coil to thereby provide a control for said circuit in accordance with electrical phenomena well known in this art.

The rotation of the shaft 14 by the operator will be carefully adjusted so as to bring about the desired critical condition, and any free or random movement of the shaft responsive to vibration or looseness of the parts would upset such calibration. To that end, the structure of the invention shown in the drawings is adapted to insure the maintenance of the shaft 13 in precisely the condition determined by the operator, and provides an effective safeguard against random or free movement thereof. A disc 25 is provided, preferably made of material softer than that of the shaft 14, and said disc is provided with a medial aperture 26 to receive and be engaged by the shaft. The aperture 26 may be in exact correspondence with or of less diameter than the threaded portion 13 of the shaft so that the shaft will have to either cut its own thread into said aperture or be tightly embraced by the formed portion thereof. The disc 25 is preferably made of a plastic material such as "nylon" having a "plastic memory" or inherent tendency to return to any condition from which it may have been displaced so that on rotation of the shaft 14, the aperture 26 would first "give" to the desired degree and then would close upon the shaft as soon as force of the rotation of the shaft by the operator is released. The parts are assembled with the disc 25 interposed between the lower end of the coil support 28 and the base member as shown in Fig. 2. In the form shown in the drawings, the tuner device disc and base member are provided with complementary means to key the disc to the base member. Said means may comprise, as shown in Fig. 1, a stud 29 formed on one of said members and receives in a complementary recess 30 formed on the other member. Said stud and recess may be either directed in a plane corresponding to that of the shaft 14 as shown in Fig. 1 or in a plane at right angles thereto as indicated by the reference characters 29' for the stud and 30' for the recess shown in Fig. 4.

In Fig. 4 the recess 30' is formed in a flange 31 on the base member 10, said flange being adapted to be turned over the lower end of the coil support 28 or onto beaded edge 32 thereof. The beaded edge 32 of the coil support 28 is shown in Fig. 1 as provided with a recess 33 to receive a second protuberance 34 formed on the disc 26; said recess may either open into the outer circumference of said beaded edge as in Fig. 1 or into the inner circumference thereof as indicated at 33' in Fig. 3.

Having thus described my invention, what I claim as new and desire to secure by Letters Patent is:

1. An electronic tuner device comprising a base member having a flat front face, a hub portion on said base member extending from said face and adapted to be positioned through the opening of a panel to which the device is to be secured, said hub portion being provided with an elongated medial aperture to receive and be engaged by the shaft of an electronic tuner proportioned to project from the base member for engagement by a tuning tool, said hub being adapted to be engaged by a member to tighten the base member in said panel, a flange on the base member extending away from the flat face thereof and defining with the base member a recess, a disc made of a material softer than that of the shaft, proportioned to be positioned within the recess and provided with a medial aperture proportioned to be tightly engaged by the tuner shaft, complementary means on the disc and base member to key them against independent movement, a support for an electronic coil adapted to be positioned in the recess, said coil and disc member having complementary means to key them against independent movement.

2. An electronic tuner device comprising a base member having a flat front face, a hub portion on said base member extending from said face and adapted to be positioned through the opening of a panel to which the device is to be secured, said hub portion being provided with an elongated medial aperture to receive and be engaged by the shaft of an electronic tuner proportioned to project from the base member for engagement by a tuning tool, said hub being adapted to be engaged by a member to tighten the base member in said panel, a flange on the base member extending away from the flat face thereof and defining with the base member a recess, a disc made of a material softer than that of the shaft, proportioned to be positioned within the recess and provided with a medial aperture proportioned to tightly engage the tuner shaft, complementary means on the disc and base member to key them against independent movement, a support for an electronic coil adapted to be positioned in the recess, said coil and disc member having complementary means to key them against independent movement, and a beaded edge formed on the coil support, the flange of the base member being adapted to be turned over said beaded edge to secure the coil support to the base member.

References Cited in the file of this patent

UNITED STATES PATENTS

| | | |
|---|---|---|
| 2,503,100 | Dewhurst et al. | Apr. 4, 1950 |
| 2,669,700 | Rauch | Feb. 16, 1954 |